(12) United States Patent
Ward et al.

(10) Patent No.: US 6,344,074 B1
(45) Date of Patent: Feb. 5, 2002

(54) VENTLESS AIR SCRUBBER ASSEMBLY WITH MULTI-STAGE FILTERS AND HOOD ENCLOSURE WITH GREAT ENTRAPMENT UNITS

(75) Inventors: John M. Ward, Harrison Township; Gregory Kolecki, Ann Arbor, both of MI (US)

(73) Assignee: EVS, Inc., Birmingham, MI (US)

( * ) Notice: Subject to any disclaimer, the term of this patent is extended or adjusted under 35 U.S.C. 154(b) by 0 days.

(21) Appl. No.: 09/521,489

(22) Filed: Mar. 9, 2000

(51) Int. Cl.[7] .................. B01D 50/00; B01D 53/02; F24C 15/20

(52) U.S. Cl. .............. 96/399; 96/135; 96/400; 96/402; 96/421; 55/320; 55/323; 55/326; 55/343; 55/357; 55/429; 55/462; 55/467; 55/483; 55/485; 55/487; 55/DIG. 36; 126/299 R; 126/299 D

(58) Field of Search ............ 96/135, 140, 142, 96/399, 400, 402, 421; 55/318, 320, 323, 326, 328, 329, 343, 350.1, 357, 395, 429, 462, 467, 483, 485, 487, DIG. 36; 95/22, 141, 143, 274, 287, 901; 126/299 R, 299 D, 299 F

(56) References Cited

U.S. PATENT DOCUMENTS

| | | |
|---|---|---|
| 3,664,255 A | 5/1972 | Kuechler |
| 3,785,124 A | 1/1974 | Gaylord |
| 3,952,640 A | 4/1976 | Kuechler |
| 4,250,870 A | 2/1981 | Kuechler |
| 4,284,421 A | 8/1981 | Howard |
| 4,286,572 A * | 9/1981 | Searcy et al. ........... 126/299 D |
| 4,346,692 A * | 8/1982 | McCauley .............. 126/299 D |
| 4,350,504 A * | 9/1982 | Diachuk ........................ 55/323 |
| 4,655,194 A * | 4/1987 | Wooden ................. 126/299 D |
| 4,884,949 A | 12/1989 | Eakin |
| 4,902,316 A | 2/1990 | Giles, Sr. et al. |
| 4,941,400 A | 7/1990 | Moore |
| 5,002,040 A * | 3/1991 | MacFarlane ........... 55/DIG. 36 |
| 5,063,906 A | 11/1991 | Rogers et al. |
| 5,154,161 A * | 10/1992 | Rogers et al. .......... 126/299 D |
| 5,215,557 A | 6/1993 | Johnson et al. |
| 5,467,761 A * | 11/1995 | Kuechler ................ 126/299 D |
| 5,577,490 A * | 11/1996 | Overton, Jr. ........... 126/299 D |
| 5,704,955 A | 1/1998 | Giles |
| 5,925,172 A | 7/1999 | Rick et al. |
| 5,941,235 A * | 8/1999 | Carter .................... 126/299 R |
| 6,036,736 A * | 3/2000 | Wallace et al. ............... 55/485 |
| 6,041,772 A | 3/2000 | Ward et al. |
| 6,041,774 A | 3/2000 | Ward et al. |
| 6,182,653 B1 * | 2/2001 | Otenbaker et al. ...... 126/299 R |

* cited by examiner

Primary Examiner—Duane Smith
Assistant Examiner—Jason M. Greene
(74) Attorney, Agent, or Firm—Gifford, Krass, Groh, Sprinkle, Anderson & Citkowski, P.C.

(57) ABSTRACT

A ventless air scrubber assembly for use with a conventional cooking appliance situated within an interior location. A ventilation hood is arrayed in an overhanging manner above the cooking appliance and includes a recessed interior defined by a planar base surface and a plurality of interconnecting sides. The hood further includes an intake and an exhaust and a plurality of individual grease extraction units located within the hood in proximity to the exhaust. A filtration housing having an inlet and an outlet is located a specified distance from the hood and is interconnected to the hood exhaust by a first length of ductwork extending filtration housing inlet. A plurality of individual filters are arrayed between the inlet and an outlet in successive fashion. The filters include particulate entrapment filters and an odor removal filter. A second length of ductwork extends between the filtration housing outlet and an inlet of an exhaust fan. The exhaust fan draws a steady flow of hot air contaminated with airborne particles such as grease and smoke from the cooking appliance, across the grease extraction units and, subsequently, the filtration housing. A third length of ductwork extends from an outlet of the exhaust fan and conveying reconditioned air for reintroduction within the interior location.

19 Claims, 9 Drawing Sheets

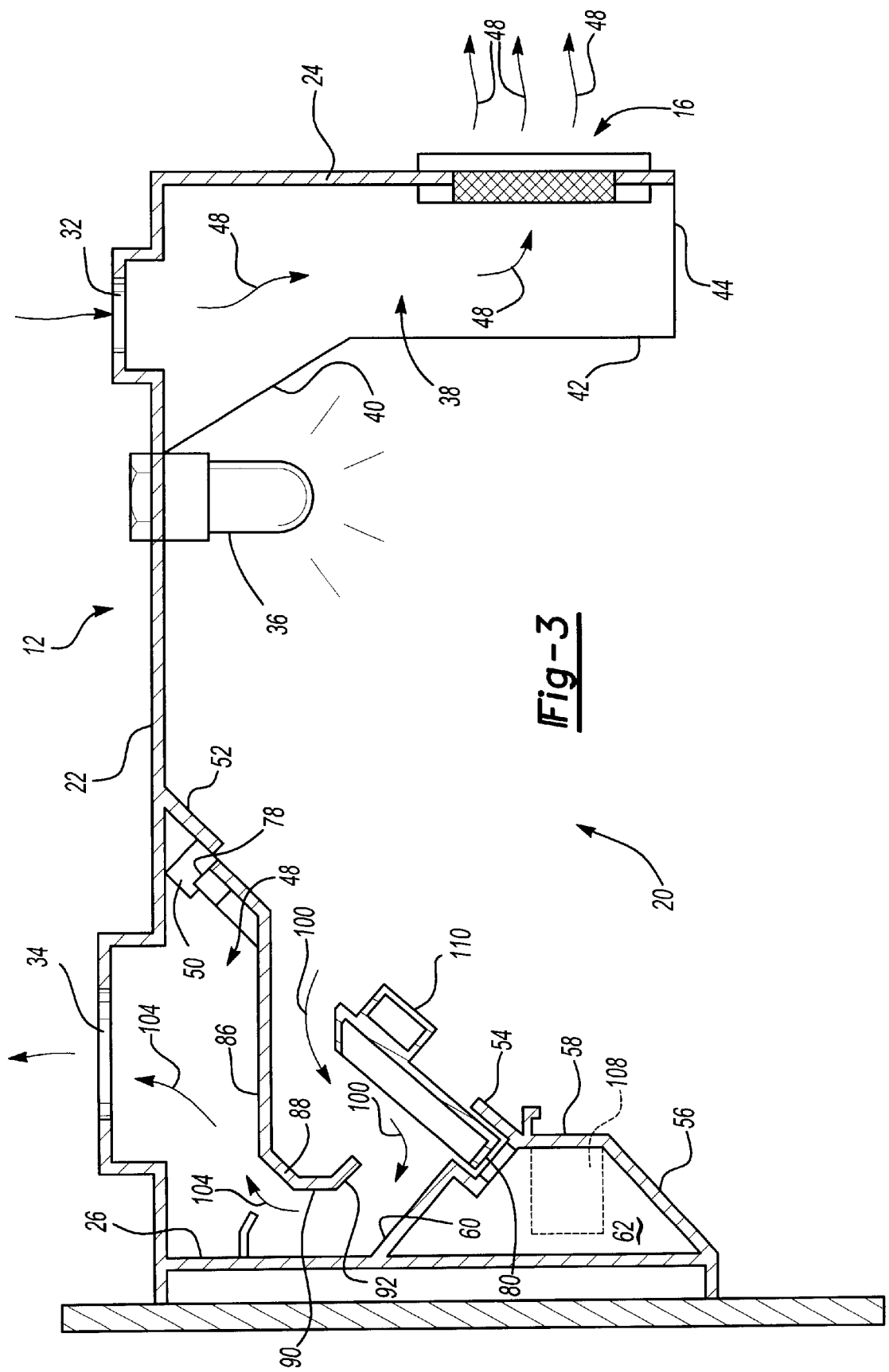

VENTLESS AIR SCRUBBER ASSEMBLY WITH MULTI-STAGE FILTERS AND HOOD ENCLOSURE WITH GREAT ENTRAPMENT UNITS

BACKGROUND OF THE INVENTION

1. Field of the Invention

The present invention relates generally to air filtration units, particularly those employed in removing grease and excessive heat from an interior location surrounding a food preparation equipment. The present invention more particularly relates to a combination equipment hood enclosure with grease entrapment units and an air scrubber assembly positioned at a remote location downstream from an outlet of the hood enclosure, the scrubber assembly including multiple stage filters for further conditioning the outlet airstream from the hood and for permitting reintroduction of the airstream within an interior location of the structure within which the assembly is arranged.

2. Description of the Prior Art

Ventilation and ventilation exhaust systems are known in the art for use with conventional cooking appliances, which tend to produce significant amounts of heat, airborne grease and smoke. It is known in the industry to provide varying kinds of ventilation hoods for use with such cooking appliances to quickly evacuate the excess heat and smoke and which is often heavily saturated with the hot airborne grease and grease vapor.

Applicants' copending application Ser. No. 09/191,184, filed Nov. 13, 1998, now issued as U.S. Pat. No. 6,041,774, teaches an overhead ventilation hood for a ventilation system of such a conventional cooking appliance. The hood includes a housing with a planar base surface and a recessed interior arrayed in a downwardly facing manner which is defined by a first side, a second spaced apart side, a first interconnecting end and a second interconnecting end. Intake and exhaust openings are formed through the housing proximate the first and second sides and the ventilation system further includes a first blower mounted in communication with a first length of ductwork extending to the intake opening to provide a stream of pressurized intake air and a second blower mounted in communication with a second length of ductwork extending from the exhaust opening to provide a stream of pressurized exhaust air. A supply plenum chamber is established along the first side of the housing interior and includes elongate and planar shaped channeling walls and a planar shaped diffuser for regulating a flow of the stream of the pressurized air into a central open interior of the housing. An exhaust plenum chamber is established along the second side of the housing interior and includes an elongate planar shaped and angularly mounted filter. Combination of heat, airborne grease and smoke are issued upwardly from the cooking appliance within the open interior of the hood and are discharged through the filter and within the stream of exhaust air concurrent with intermixing with the regulated flow of the stream of intake air. An elongate and planar shaped deflector extends in proximity to a bottom edge of the angularly disposed filter at a further specified angular orientation and causes a deflected stream of exhaust air to be redirected towards the filter for evacuation from the housing.

A further example of an overhead ventilation system, cited as Applicants' copending application Ser. No. 09/191,174, filed Nov. 13, 1998, now issued as U.S. Pat. No. 6,041,772, discloses a housing with a planar base surface and a recessed interior arrayed in a downwardly facing manner and which is defined by a first side, a second side, a first interconnecting end and a second interconnecting end. Intake and exhaust openings are formed through the housing proximate the first and second sides. The ventilation system includes a first blower mounted in communication with a first length of ductwork extending to the intake opening to provide a stream of pressurized intake air and a second blower mounted in communication with a second length of ductwork extending from the exhaust opening to provide a stream of pressurized exhaust air. A supply plenum chamber is established along the first side of the housing interior and includes first and second planar shaped channeling walls and a planar shaped diffuser for regulating a flow of the stream of pressurized air into a central open interior of the housing. The diffuser includes fixed grid members and spaced apart and pivotal blade members to adjust an airflow through the plenum chamber. An exhaust plenum chamber is established along the second side of the housing interior and includes an elongate planar shaped and angularly mounted filter. Combinations of heat, airborne grease and smoke are issued upwardly from the cooking appliance within the open interior of the hood and are discharged through the filter and within the stream of exhaust air concurrent with intermixing with the regulated flow of the stream of intake air.

A more specific situation often encountered in overhead ventilation assemblies, and which is not particularly addressed by such hood assemblies as described above, is where, out of necessity, the exhaust stream issued from the exhaust plenum chamber must be reintroduced into an internal environment as opposed to being evacuated or vented outside of the structure within which the cooking appliance is situated. This is most often encountered in situations such as where the cooking appliance is located within a ground or lower level of a multi-story building. Most of the existing local codes for such assemblies require that an upwardly extending exhaust line be installed from the exhaust chamber of the hood to the top of the building structure for venting. When considering the cost of running such a length of pipe, which may extend upwardly many feet in view of the relatively great heights of some multi-story structures, combined with the requirements of one or more blowers located at intermediate and/or end locations between the oven hood and the top of the structure, the cost of external venting in such applications, and as is conventionally known, has been found to be prohibitively expensive.

Referring to U.S. Pat. No. 4,902,316, issued to Giles, Sr. et al, an attempt has been made to construct an apparatus for cooking food in a conventional oven having a conveyor and including a ventless exhaust system in which a fan pulls heated air through a filter system including an aluminum filter, an electrostatic precipitator, and a charcoal filter. Giles discloses then being able to recirculate the cleaned air within the building space in which the oven is located.

While the oven and ventless exhaust system of Giles has been found to be useful for removing grease and moisture-laden heated air, as stated in its disclosure, it has been found that such a system suffers from a number of shortcomings, among them being the ability to quickly and effectively change or replace the filters and the relative inefficiency of the electrostatic precipitator in removing grease and other airborne particles.

SUMMARY OF THE PRESENT INVENTION

The present invention is a ventless air scrubber assembly which is an improvement over the prior art in that it provides for significant cleaning and reconditioning of smoke, grease and odor laden air produced by a conventional cooking appliance. The scrubber assembly according to the present invention is effective to the degree that the reconditioned air may be reintroduced to an interior location of the structure, this being especially advantageous in situations where the cooking appliance is located in a ground or lower level of a multi-story structure, and where relevant ordinance codes would otherwise require the installation of lengthy and expensive upward venting lines and impeller assemblies in order to conventionally vent such byproducts of the cooking appliance.

A ventilation hood is arrayed in an overhanging manner above the cooking appliance and includes a recessed and downwardly facing interior which is defined by a planar base surface, a first extending side, a second spaced apart and extending side, a first interconnecting end and a second interconnecting end. The hood further includes an intake and an exhaust and at least one vapor proof and incandescent light mounted to the planar base and extending downwardly within the recessed interior. A supply plenum chamber defines a first sub-divided volume of the recessed interior and is located proximate the first side and the intake. The supply plenum chamber further includes a plurality of interconnecting and planar shaped channeling walls which enclose the first sub-divided volume. Fascia grills are mounted within the first extending side, are communicable with the supply plenum chamber, and cause tempered inlet air to be drawn from the hood interior.

An exhaust plenum chamber defines a second sub-divided volume of the recessed interior and is located proximate the second side and the exhaust. A plurality of grease extraction units are installed between angularly disposed brackets extending between the first and second interconnecting ends and for supporting each of the extraction units within the hood interior. The brackets define the interior boundary of the exhaust plenum chamber and, during the evacuated flow of dirty air produced by the cooking appliance, the installed extraction units entrap significant volumes of grease and other airborne particulates which are then collected within at least one grease extraction cup mounted in proximity to a lower of the angularly disposed brackets for collecting the run-off grease.

Each of the grease extraction units further includes a planar shaped main body with front and rear faces and opposite edges for respectively engaging the first and second angularly disposed brackets. An extractor opening is formed through the main body and is defined by inwardly facing edges. A channeling structure encircles the inwardly facing edges of the rear face and extends rearwardly in a generally downwardly angled fashion. The channeling structure includes a succession of turns against which is impacted the particulate laden airflow prior to the exhaust. Extraction handles extend from the front face of each unit and permit the selected unit to be dismounted from the hood enclosure for cleaning and other maintenance.

A filtration housing is mounted at a specified remote location from the hood, either within an interior location or exterior location of the structure depending upon space availability. An inlet of the housing is interconnected with the exhaust of the hood by a first length of ductwork. The filtration housing includes a generally elongated and three dimensional rectangular configuration and includes a plurality of separate channel frames mounted in cross wise fashion and which permit the installation of a plurality of likewise rectangular shaped filters. Enabling switches are located in proximity to each of the channel frames and are communicable with a microprocessor mounted in proximity to the filtration housing. The switches each determine the installation and engagement of an associated filter and enable the activation of the system.

The type and construction of the multi stage filters are such that they are intended to remove remaining quantities of grease and other particulates not previously entrapped by the grease extraction units of the hood. In a preferred embodiment, first and second stage filters are provided as pleated and extended surface filters for filtering out a majority of the remaining particulates delivered from the hood exhaust. A third stage HEPA filter removes substantially all of the remaining particulate delivered by air flowing from the second filter and a fourth stage pleated filter with activated carbon follows up by removing odors from the air flow. A fire damper is provided as a fifth stage, located beyond the fourth stage odor removal filter, and including at least one fluid injection hose and a plurality of overlapping and planar shaped members pivotally interconnected together in accordion fashion and gravity actuated to establish a firewall in the event of fire or excessive smoke determined by the microprocessor to exist within the filtration housing interior or under or in the hood.

The drawing of the particulate laden air from the specified cooking equipment, through the hood, and across the filtration housing, is enabled by an exhaust fan communicable with the housing by a second length of ductwork extending between an outlet of the housing and an inlet of the fan. A third length of ductwork extends between an outlet of the exhaust fan and a selected remote location and operates to convey reconditioned quality air for reintroduction within the building interior.

Beyond a determined maintenance schedule for cleaning the grease extraction units in the hood, monitoring capabilities are provided for determining the replacement of selected filters within the housing. This includes the provision of a first static pressure gauge mounted in proximity to an airflow determined across the first and second stage filters. Upon measuring a determined status pressure drop, a flashing light or other indicia is provided for announcing the replacement of a filter. A second static pressure gauge is mounted in proximity to an airflow determined across the third stage HEPA filter and, upon a likewise determined static pressure drop below a minimal acceptable value, signals the required replacement of that filter. In the event the HEPA filter is not replaced when indicated, and a further lower value of the static pressure gauge is obtained, the microprocessor will deactivate the exhaust fan and issue a warning.

BRIEF DESCRIPTION OF THE DRAWINGS

Reference will now be made to the attached drawings, when read in combination with the following detailed description, wherein like reference numerals refer to like parts throughout the several views, and in which:

FIG. 3 is a cutaway view, taken along line 3—3 of FIG. 2, and illustrating in end view fashion the construction of the supply plenum chamber and exhaust plenum chamber according to the present invention;

DESCRIPTION OF THE PREFERRED EMBODIMENTS

Figure 1:
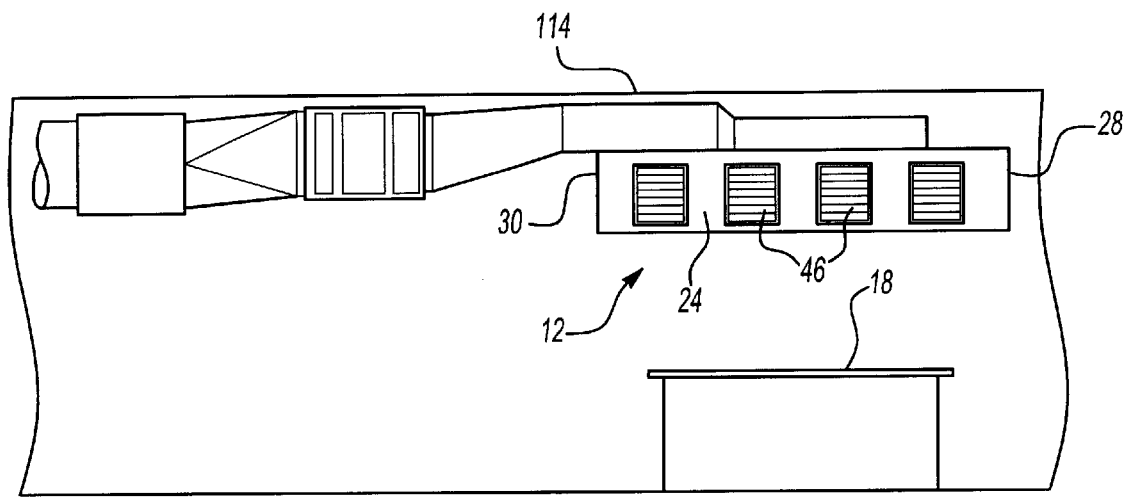
FIG. 1 is a partial side view of the ventilation hood forming a portion of the ventless air scrubber assembly according to the present invention, arrayed in overhanging fashion above the conventional cooking appliance, and illustrating the plurality of fascia grills for introducing tempered inlet air to the interior location.
Figure 14:
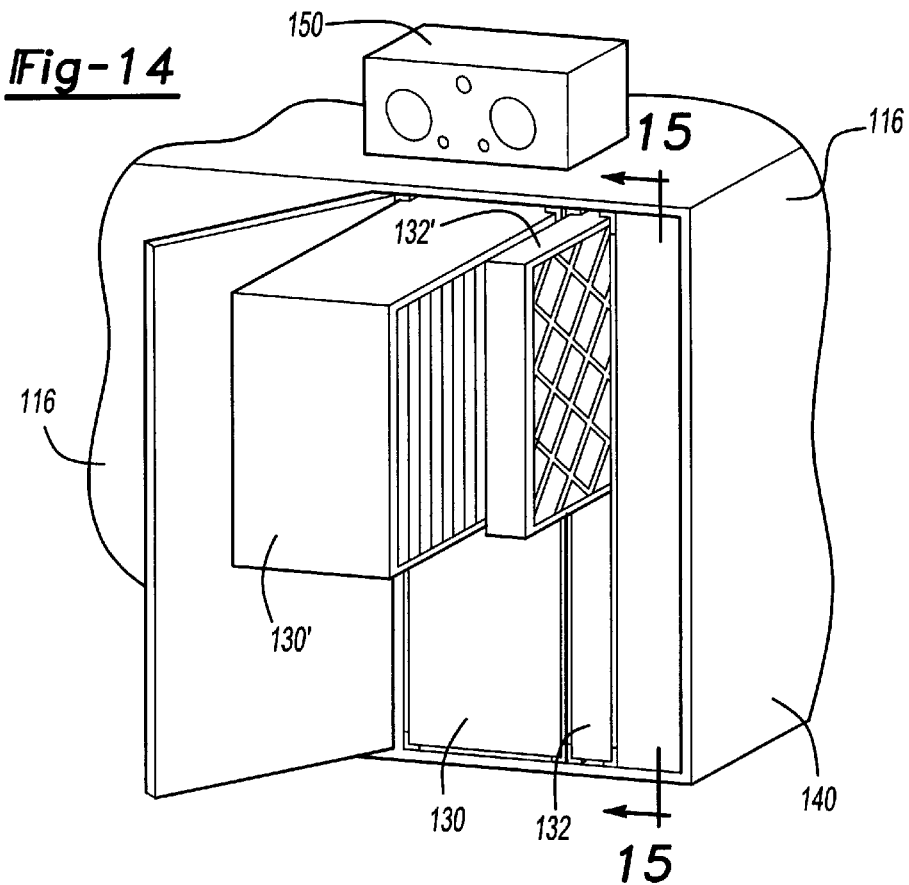
FIG. 14 is a similar partial perspective of the third and fourth stage filters according to the present invention.

Referring now to FIGS. 1 and 14, viewed in combination, a ventless air scrubber assembly is illustrated according to the present invention. As will now be described in significant detail, the main components of the air scrubber assembly include a ventilation hood 12, a filtration housing 14 and an exhaust fan 16. As further previously stated, the air scrubber is an improvement over the prior art in that it provides for significant cleaning and reconditioning of smoke, grease and odor laden air produced by a conventional cooking appliance (seen in FIG. 1 at 18). Such a conventional cooking appliance need not be further described and is typically known to includes such appliances as ovens and the like, these tending to create such airborne particulates as may include smoke, grease and odors. As also previously stated, the scrubber assembly according to the present invention is effective to the degree that the reconditioned air may be reintroduced to an interior location of the structure within which the assembly is constructed, this being especially advantageous in situations where the cooking appliance is located in a ground or lower level of a multi-story structure, and where relevant ordinance codes would otherwise require the installation of lengthy and expensive upward venting lines and impeller assemblies in order to conventionally vent such byproducts of the cooking appliance.

Referring again to FIG. 1, as well as to FIG. 3, the ventilation hood 12 is arrayed in an overhanging manner above the cooking appliance 18 and, as best shown in the cutaway of FIG. 3, includes a recessed and downwardly facing interior 20 which is defined by a planar base surface 22, a first extending side 24, a second spaced apart and extending side 26, a first interconnecting end 28 (see view of FIG. 1) and a second interconnecting end 30. The hood 12 is typically constructed of an 18 gauge type 304 stainless steel with continuous external weldments on all seams.

The hood 12 further includes an intake 32, an exhaust 34 and at least one vapor proof and incandescent light 36 mounted to the planar base 22 and extending downwardly within the recessed interior 20. A supply plenum chamber 38 defines a first sub-divided volume of the recessed interior 20 and is located proximate the first side 24 and the intake 32. The supply plenum chamber 38 further includes a plurality of interconnecting and planar shaped channeling walls, best shown in the cutaway of FIG. 3 as first downwardly and outwardly angled wall 40, second vertically downwardly extending wall 42, and third horizontally extending wall 44 and which, in combination, enclose a first sub-divided volume of the supply plenum chamber 38. Fascia grills 46 are mounted within the first extending side 24, communicable with the supply plenum chamber 38, and cause tempered inlet air to be drawn, through the operation of the exhaust fan 16, from through the intake 32 of the hood interior 20 and along the direction of arrows 48 through both the supply plenum interior 38 and the surrounding room exterior beyond the fascia grills 46. The fascia grills 46 each include a desired loose mesh or other suitable medium for providing regulated airflow of the intake air through the fascia grills 46. The purpose of the supply plenum chamber 38 and the fascia grills 46 will be explained in more detail with further the description of the remaining components of the air scrubber assembly.

An exhaust plenum chamber 48 defines a second sub-divided volume of the recessed interior 20 and is located proximate the second side 26 and the exhaust 34 of the oven 12. The exhaust chamber 48 is further defined by a first cross wise extending and angularly disposed bracket 50 extending in cross wise fashion across the hood 12 from a support 52 in turn secured to the planar base surface 22, as well as by a second cross wise extending and angularly disposed bracket 54. The second bracket 54 is secured at a lower location a spaced distance from the second side 26 and within the hood 12 interior by a supporting and recessing structure, such structure including a lower angled wall 56, a central wall 58 and an upper angled wall 60 which in combination support the second bracket 54 and also define an interior volume 62.

Figure 4:
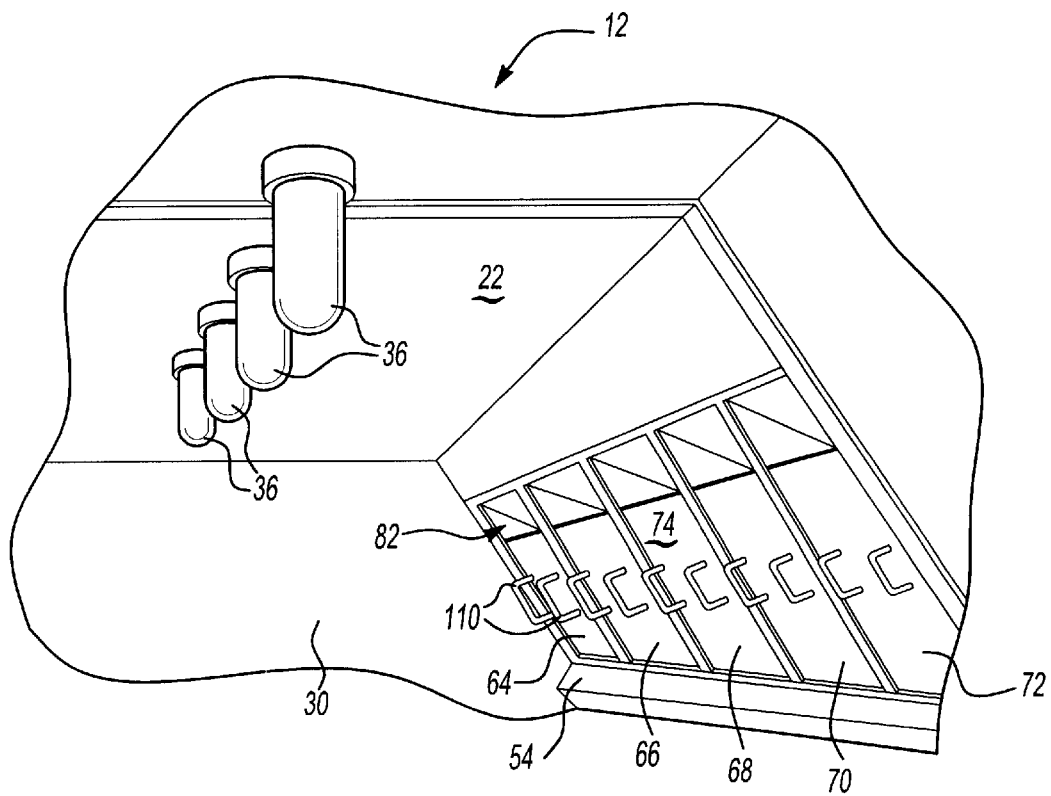
FIG. 4 is a perspective end view of the ventilation hood and illustrating in additional detail the arrangement of the plurality of individual grease extraction units according to the present invention.

A plurality of grease extraction units are installed between the angularly disposed brackets 50 and 54 and extend between the first 28 and second 30 interconnecting ends within the hood interior. Referring to the partial perspective view of FIG. 4, a first 64, second 66, third 68, fourth 70 and fifth 72 grease extraction unit are illustrated. It is understood that any suitable plurality of grease extraction units can be employed within the scope of the present invention.

Referring to FIGS. 5, 6, 7 and 8 in combination, varying views of a selected grease extraction unit, identified for purposes of this explanation as first extraction unit 64, are illustrated. For further purposes of this description, it is understood that each and every of the grease extraction units are identically constructed, therefore a repetitive description of each is unnecessary.

The grease extraction unit 64 includes a planar shaped main body with front 74 and rear 76 faces and top 78 and bottom 80 opposite edges for respectively engaging the first and second angularly disposed brackets 50 and 54. An extractor opening 82 is formed through the main body and is defined by inwardly facing edges and in the preferred embodiment form a rectangular like shape as is evident in the illustrations. A channeling structure 84 encircles the inwardly facing edges of the rear face 76 of the selected extraction unit 64 and extends rearwardly in a generally downwardly angled fashion. In particular, the channeling structure 84 includes a succession of downward, rearward and upward airflow turns which are dictated by interconnecting planar surfaces 86, 88, 90, 92, 94 and 96 (see as best illustrated in side cutaway of FIG. 7).

Figure 6:
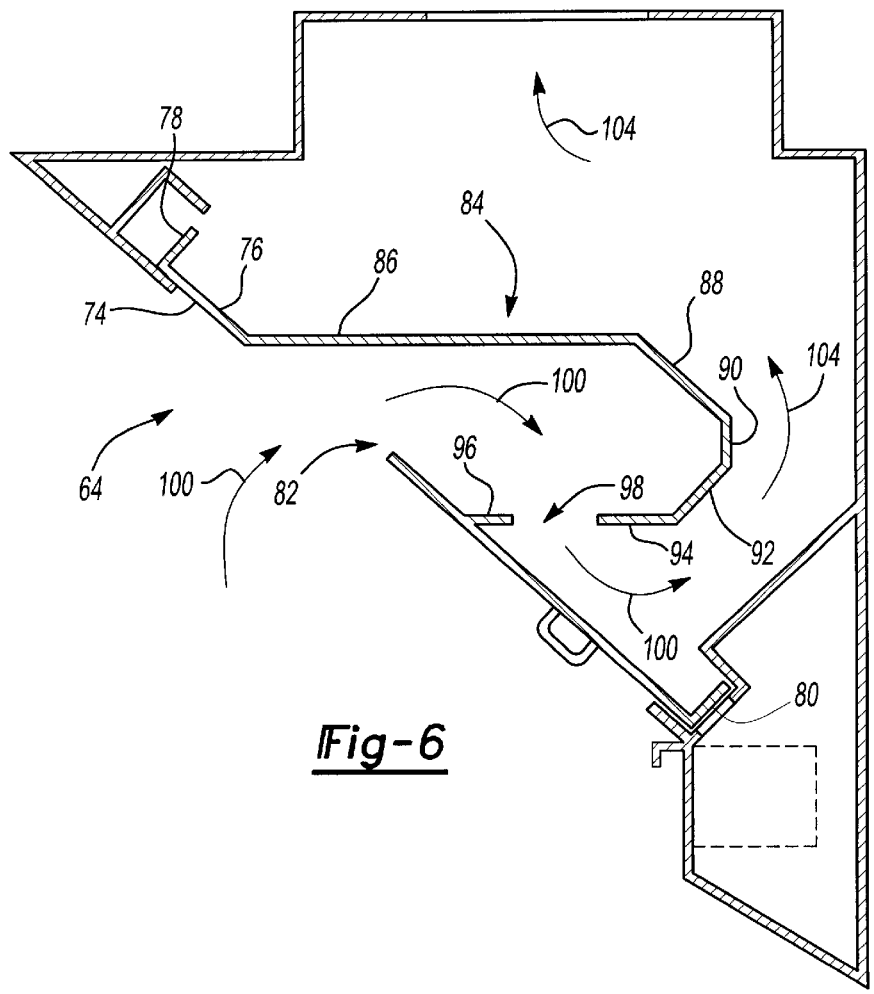
FIG. 6 is a partial side view illustration, similar in regards to FIG. 3, and showing the direction of the particulate laden airflow through the channeling structure forming a part of each extraction unit and according to the present invention.
Figure 7:
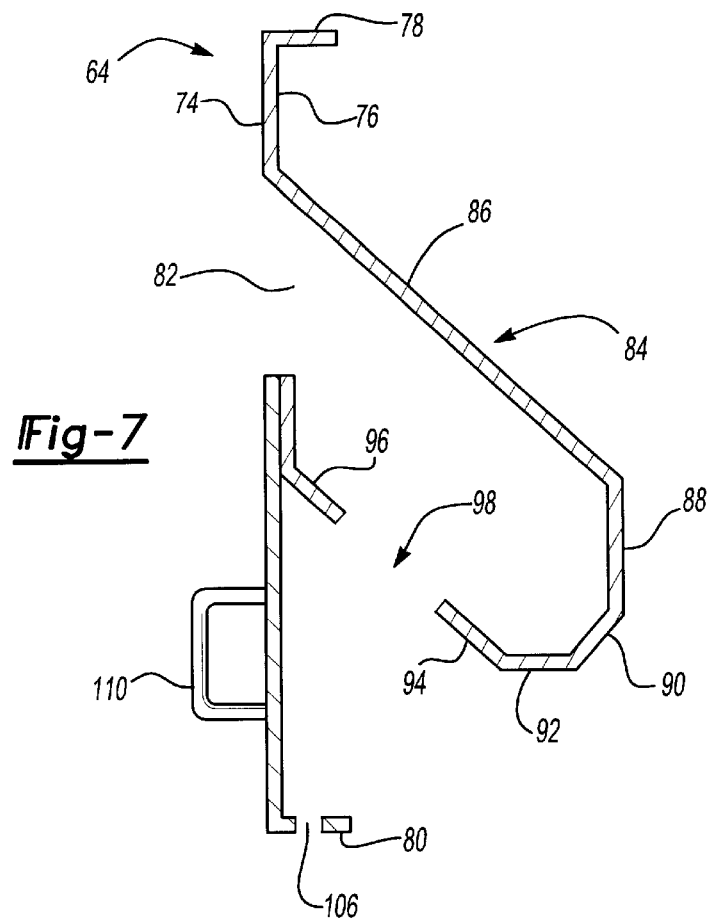
FIG. 7 is a cutaway view taken along line 7—7 of FIG. 5 and illustrating another view of the selected grease extraction unit according to the present invention.

A gap 98 is formed between the planar surface 94 and 96 and provide for passage of the particulate laden airflow indicated by directional arrows 100 in FIG. 6. Additional end walls, such as shown at 102 in FIG. 5, close the ends of the channeling structure. During the evacuated flow of dirty air produced by the cooking appliance 18, the installed extraction units, again such as unit 64, entraps significant volumes of grease and other airborne particulates caused by the circuitous airflow in the direction of the arrows 100 both through and around the channeling structure. It has been found in experimentation that upwards of 75% to 80% of the grease and airborne particulates are captured by being impinged against the interconnecting surfaces and prior to the airflow being exhausted from the hood as shown by arrows 104 in FIG. 6.

Figure 8:
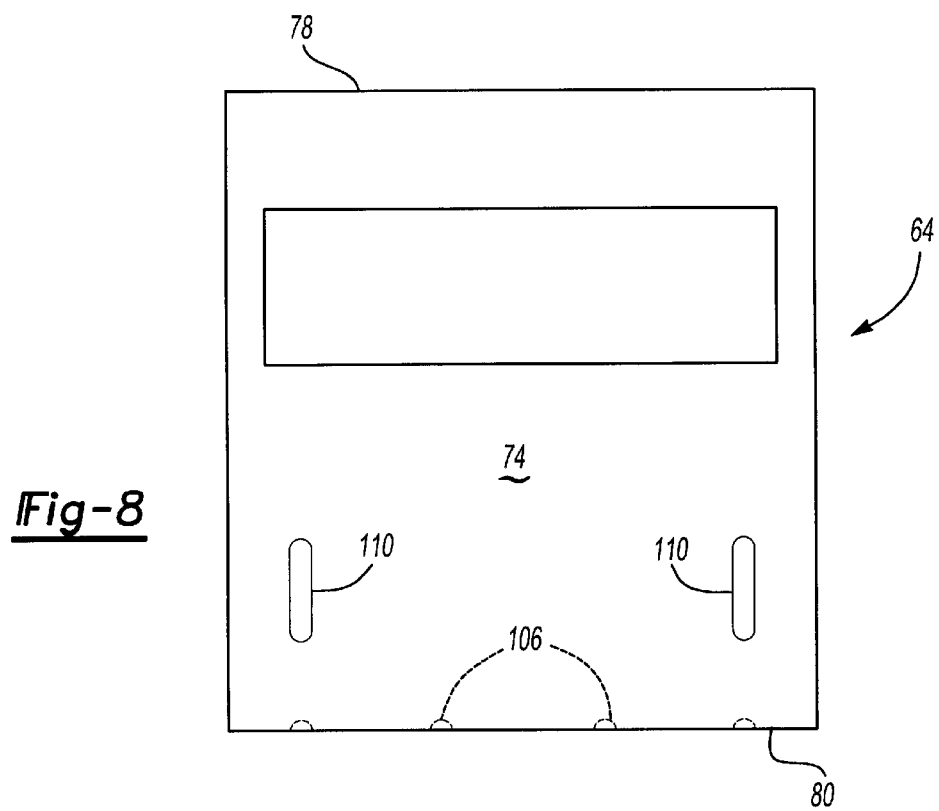
FIG. 8 is an front view of the grease extraction unit shown in FIG. 7.

To assist in the collection of entrapped grease and other particulates, weep holes 106, see FIG. 8, may be formed along the bottom edge 80 of a selected entrapion unit 64. As is further best shown in the cutaway of FIG. 3, a grease collection cup 108 is situated within the interior volume 62 of the recessing structure and operates to collect grease runoff from the various extraction units. The cup 108 is preferably mounted at one cross wise extending end of the exhaust chamber and in proximity to the second angularly disposed and supporting bracket 54. The second bracket 54 or similar structure in the vicinity may function as a conduit for channeling the grease for collection within the cup 108 and it is further envisioned that the bracket or like structure 54 may be angled or tilted downwardly a selected degree and in its cross wise running manner so as to facilitate the collection of the grease. Extraction handles 110 extend from the front face 74 of each unit (again such as unit 64) and permit the selected unit to be dismounted from the hood enclosure 12 for cleaning and other maintenance needs.

Referring now to FIGS. 12, 13, 14 and 15, when read in combination with FIGS. 1 and 3, the filtration housing 14 is illustrated mounted at a specified remote location from the hood 12, and within the interior location. An inlet 112 of the housing 14 is interconnected with the exhaust 34 of the hood 12 by a first length of ductwork 114 generally illustrated in FIG. 1 and which is understood to include standard construction as known in the art. As again shown in FIG. 12, a further expansion piece of ductwork 116 interconnects with an end of the first length 114 and leading into the inlet 112 of the filtration housing 14.

The filtration housing 14 is typically constructed of a 0.16 gauge steel housing with continuous external weldments and is finished with a machine grade enamel. The housing 14 includes a generally elongated and three dimensional rectangular configuration and with a plurality of separate channel frames mounted in cross wise fashion and which permit the installation of a plurality of likewise rectangular shaped filters. Referring to the cutaway side profile of FIG. 12, a crosswise view is seen of the various channel frames and includes first upper and lower frame supports 118, second upper and lower frame supports 120, third upper and lower frame supports 122 and fourth upper and lower frame supports 124.

The type and construction of the multi stage filters are such that they are intended to remove the remaining quantities of grease and other airborne particulates not previously entrapped by the grease extraction units of the hood enclosure 12. In the preferred embodiment, the frame supports 118, 120, 122 and 124, respectively receive first 126, second 128, third 130 and fourth 132 stage filters. As is further shown in FIGS. 12–14 in succession, the construction of the filtration housing 14 in one preferred variant provides for the assembly of banks of four filters for each of the first 126, second 128, third 130 and fourth 132 stages and which are held in associated channel frame supports.

Figure 12:
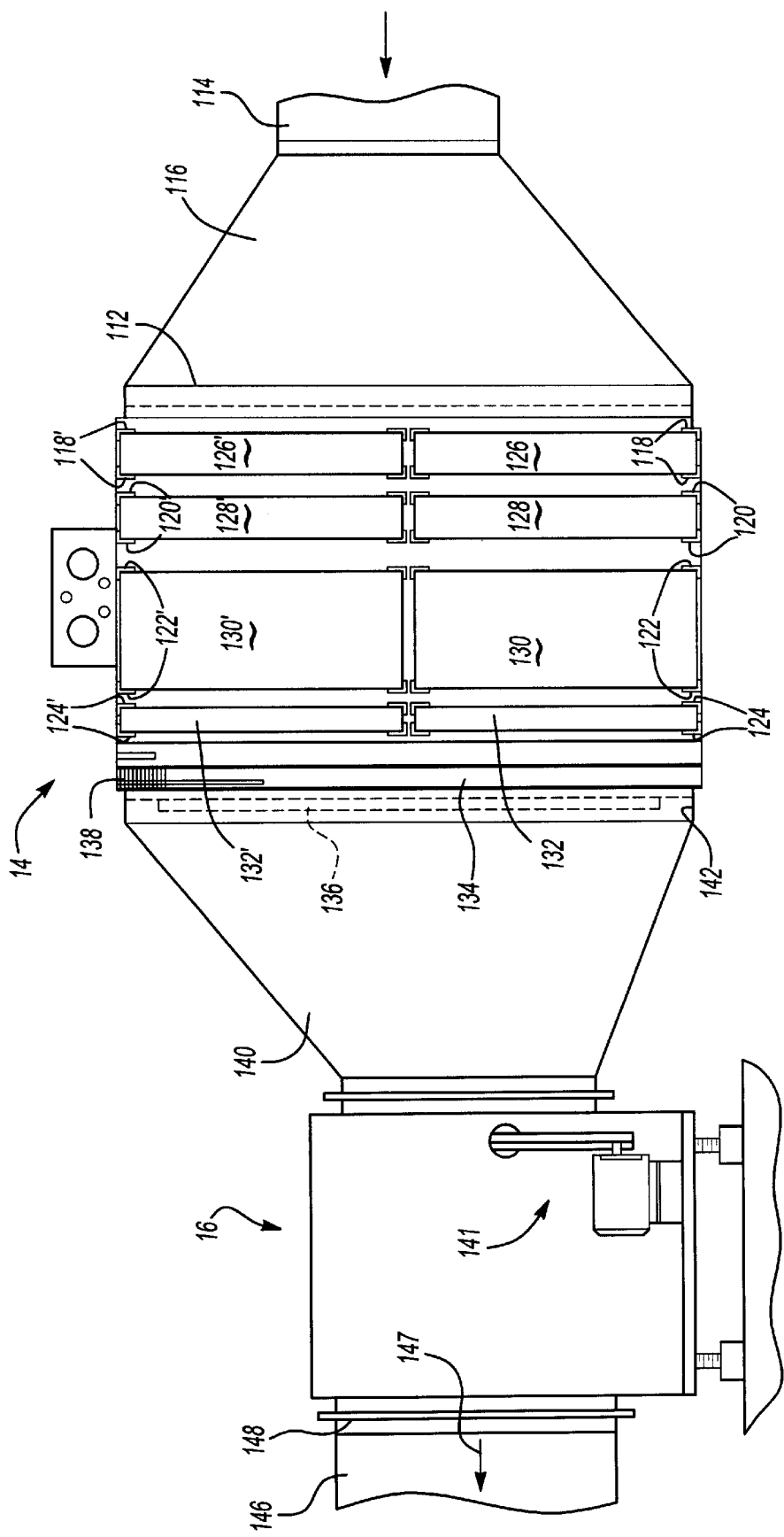
FIG. 12 is a side view of a multi-stage filtration housing and exhaust fan, forming portions of the overall scrubber assembly, and according to the present invention.

As is particularly shown in the side view of FIG. 12, additional first through fourth upper channel frames 118', 120', 122' and 124' correspond to the lower positioned channel frames 118, 120, 122 and 124 and suitably receive identically configured and additional first through fourth stage filters 126', 128', 130' and 132'. An identical arrangement of third and fourth upper and lower channel frames and filters, although not specifically illustrated, is clearly and evidently provided on a reverse side of the housing 14. The embodiment illustrated contemplates the first, second, third and fourth banks of four filters apiece, with the first stage filters having dimensions of 24×24×2 inches, the second stage filters likewise being 24×24×2 inches, the third stage filters being 24×24×12 inches and the fourth stage filters again being 24×24×2 inches. This construction conforms to an intended configuration of the filtration housing as being 48×48×36 inches internal diameter in the variant of FIGS. 12–14. It is however understood that any greater or lesser number of filters in a selected bank of filters can be employed without departing from the scope of the instant invention. It is further envisioned that only a single filter at each stage may be employed and this is made possible by either increasing the size of the individual filters to match the overall cross wise configuration of the filtration housing or, alternatively, providing a smaller dimensioned filtration housing as which is easily within the intended scope of the invention.

Referring again to FIG. 12 and FIG. 13, the first stage filters, again illustrated by first and second such filters 126 and 126', each include a pleated grease filter having up to a 30% particle entrapment efficiency. The second stage filters illustrated at 128 and 128' are constructed as extended surface filters (this constituting an increased and tighter weave construction as opposed to the first stage filters 126 and 126') and having up to an 85% particle entrapment efficiency. The third stage filters represented at 130 and 130' include HEPA filters having up to a 99.9% particle entrapment efficiency and which act to essentially remove all remaining airborne particulates which may have escaped the grease extraction units of the hood enclosure 12, the first stage filters 126 and 126' and the second stage filters 128 and 128'. The effectiveness of the third stage HEPA filters 130 and 130' is to remove particulates down to approximately 0.03 microns in size and to filter out of the air stream approximately 99.99% of the existing particulates drawn into the hood 12. The fourth stage filters 132 and 132' are pleated filters with activated carbon for removal of odors from the airflow.

Figure 15:
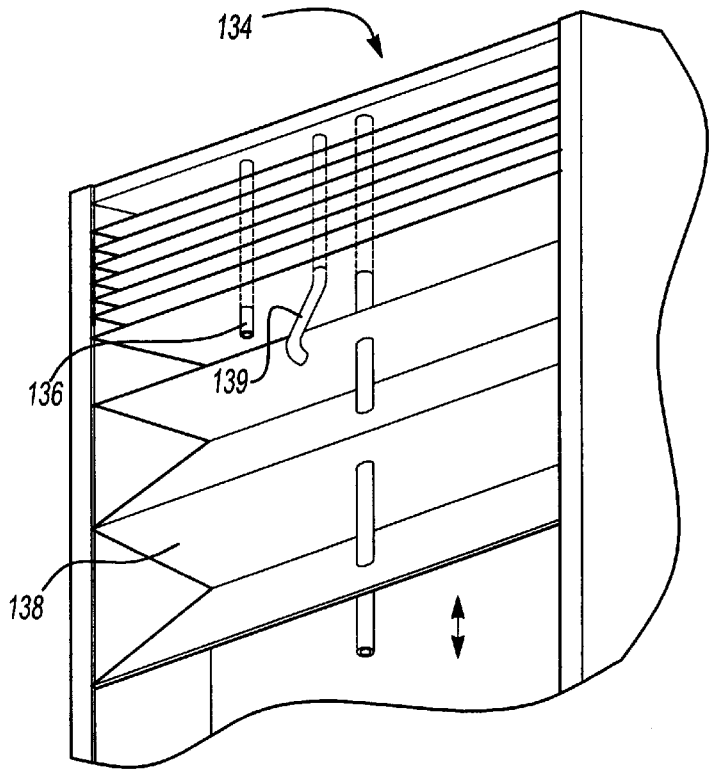
FIG. 15 is a cutaway taken along line 15—15 of FIG. 14 and illustrating a fifth stage fire damper within the filtration housing and according to the present invention.

Referring again to FIG. 12 and further to FIG. 15, a fire damper 134 is provided as a fifth stage, located beyond the fourth stage odor removal filters 132 and 132'. The fire damper 134 includes at least one fluid injection hose 136 for suppressing any fire within the housing 14 and a plurality of overlapping and planar shaped members 138 which are pivotally interconnected together in accordion fashion and gravity actuated to establish a firewall in the event a fire is determined to exist within the housing. The fluid introduced to the damper is preferably a liquid chemical fire suppressed of conventional composition. Additionally, the planar shaped members are held in place by a melting/fusable link 139 which, upon application of a specified degree of heat, releases to close the damper A second length of ductwork 140 extends between an outlet 142 of the filtration housing 14 and an inlet 144 of the exhaust fan 16. The exhaust fan 16 is constructed of a heavy gauge welded steel with a machine grade enamel coating and includes a backward curved centrifugal airfoil wheel which is belt driven and which is illustrated further at 141 in FIG. 12. The exhaust fan 16 is activated to draw, from the cooking appliance 18, across the grease extraction units, and through the filtration housing 14 and installed multi-stage filters a steady flow of heated exhaust air which is contaminated with the airborne particulates such as grease and smoke, the particulate laden airflow being reconditioned as previously described. A third length of ductwork 146 extending from an outlet 148 of the exhaust fan 16 conveys reconditioned air (see arrow 147) for reintroduction within a selected interior location (not shown). The reconditioned air is substantially free from all odors, particulates and other contaminants and is usually represented into the building interior at only a slightly increased temperature, typically no more than 90° to 100° Fahrenheit, this having little effect on the building's own air conditioning or heating capabilities.

Figure 9:
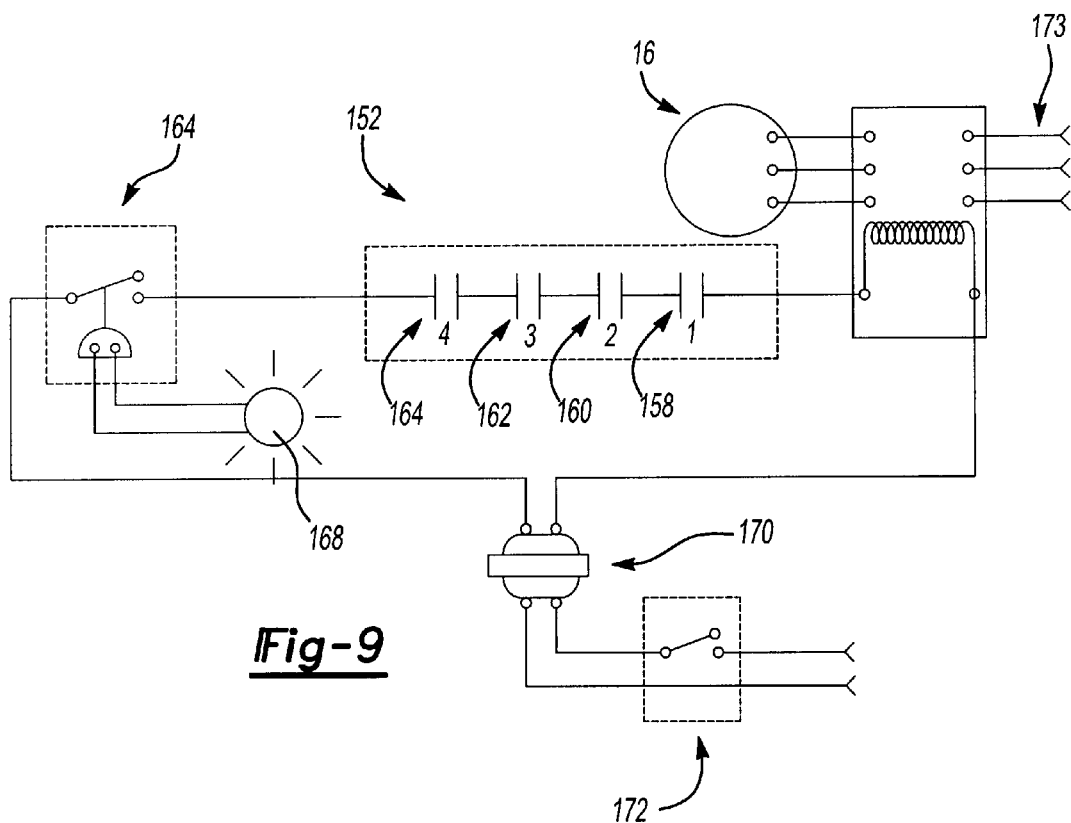
FIG. 9 is an electrical schematic of the exhaust fan, enabling switches and first static pressure gauge mounted within the multi-stage filtration housing according to the present invention.
Figure 10:
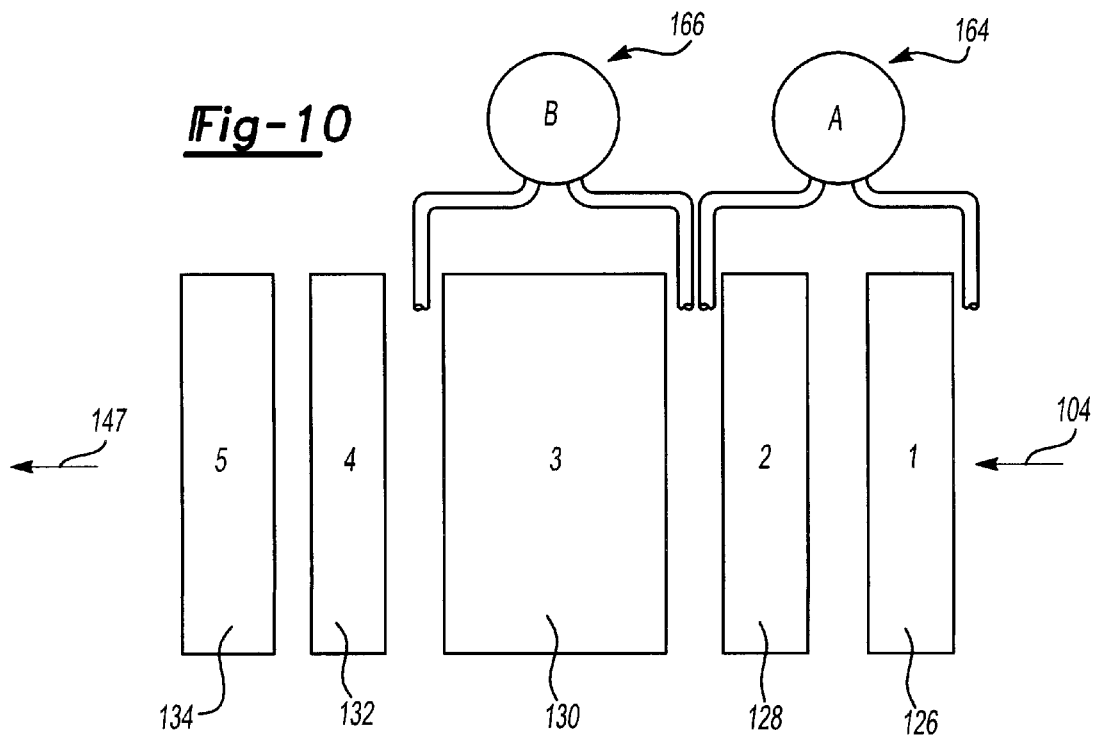
FIG. 10 is a diagrammatic view of the multi-stage filtration housing and illustrating the first and second stage pressure gauges for determining replacement of selected filters.
Figure 11:
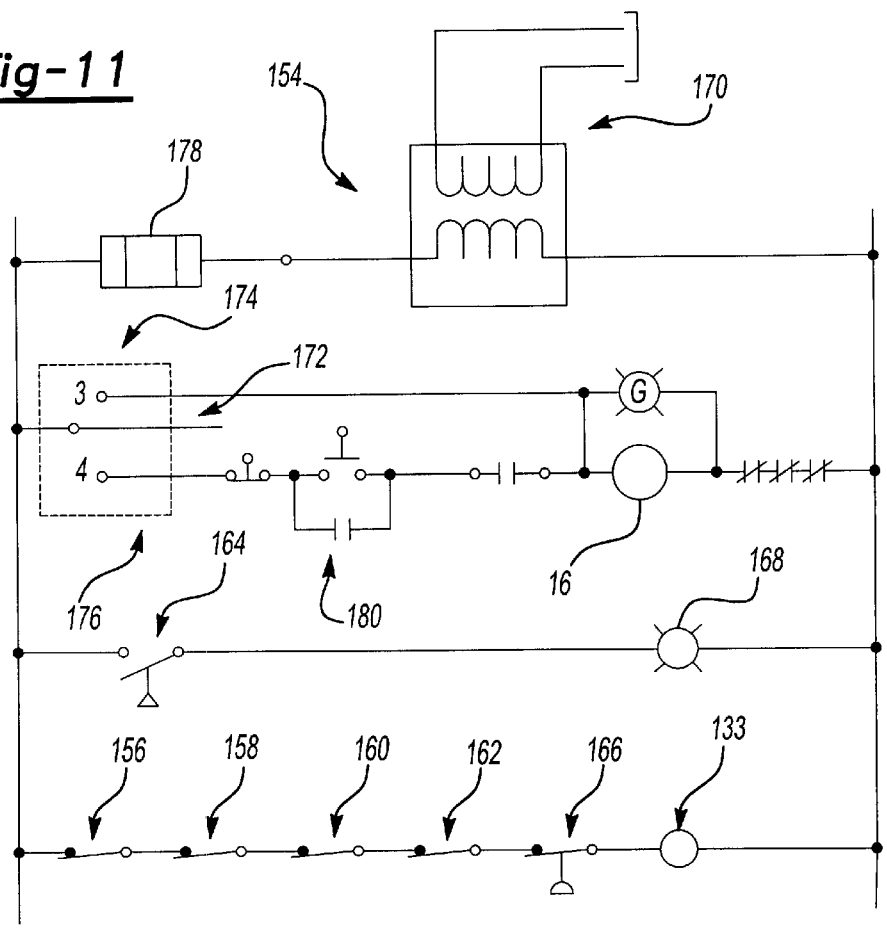
FIG. 11 is an additional schematic wiring diagram illustrating the arrangement of the filter enabling switches, the first and second static pressure gauges and the manual and auto operating options of the scrubber assembly according to the present invention.
Figure 13:
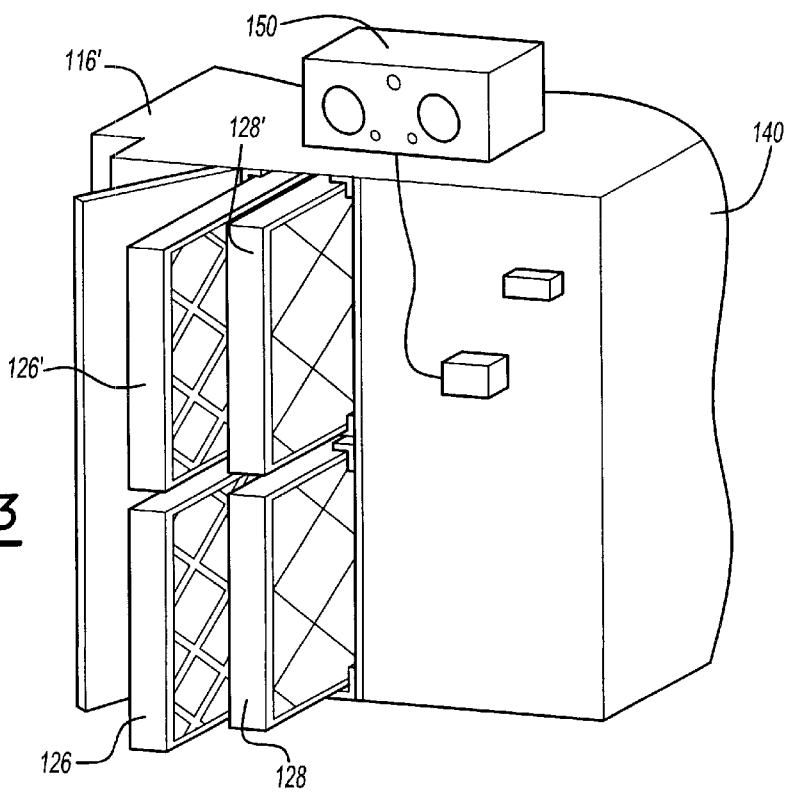
FIG. 13 is a first partial perspective of the first and second stage filters and the static pressure gauge according to the present invention.

Referring to FIGS. 9–11, a description of the operational and monitoring aspects of the scrubber assembly will now be had and as supported by the diagrammatic and schematic illustrations provided. A plurality of enabling switches are located in proximity to each of the channel frames and are communicable with a microprocessor, this potentially forming a part of a gauge structure 150 (see in FIGS. 12–14) mounted atop the filtration housing 14. Additional aspects and functions of the microprocessor and gauge structure 150 will be subsequently described in additional detail.

Referring to the diagrammatic views 152 of 154, respectively, of FIGS. 11 and 12, first through fourth enabling switches are represented schematically at 156, 158, 160 and 162. Each switches are communicable with the microprocessor, via a control relay 133, and must be closed by the installation and engagement of an associated filter 126, 128, 130 and 132 within its associated channeling frame to permit the system to be activated.

Beyond a determined maintenance schedule for cleaning the grease extraction units in the hood, monitoring capabilities are provided for determining the replacement of selected filters within the housing. Referring also to FIG. 10, the monitoring of the filters is provided by a first static pressure gauge 164 and a second static pressure gauge 166, each of which are mounted in proximity to an airflow determined across selected of the filters. In particular, the first static pressure gauge 164 determines such an airflow across the first and second filters 126 and 128, whereas the second static pressure gauge 166 determines the airflow across the third HEPA filter 130.

Upon measuring a determined status pressure drop, the first gauge 164 causes a flashing light or other indicia (see at 168 in FIGS. 9 and 11) to illuminate and announces the necessity of replacing a selected filter. In experimentation, it has been determined that the first and second filters are considered clean with a static pressure values of 0.37 inches of water and 0.60 inches of water, respectively. The filters are considered dirty and in need of replacement upon the detected static pressure rising to 0.60 inches and 1.00 inches for the first and second filters, respectively.

The second static pressure gauge 166 is likewise mounted in proximity to an airflow determined across the third stage HEPA filter and, upon a likewise determined static pressure drop below a minimal acceptable value (such as 1.50 inches of water corresponding to a clean condition), signals the required replacement of that filter. Further experimentation has found that such a HEPA filter is found to be in need of replacement upon achieving a static water pressure of 2.5 inches of water. In the event the HEPA filter is not replaced when indicated, and a further selected lower value of the static pressure gauge is read, the microprocessor will deactivate the exhaust fan and issue a warning. A further pressure gauge can be employed for the fourth stage filter 132 within the scope of disclosure provided above or, alternatively, this filter can be routinely replaced at a given time interval to provide its function of odor removal. Additional testing of this filter has found that it will generally require replacement once the charcoal/carbon weave has raised the static pressure from a clean value of 0.20 inches of water to a dirty value of 0.25 inches.

Referring again to FIGS. 9 and 11, additional aspects of the schematics illustrated include the input power source 170 (such as is typically a 24V/115V source), on off switch 172 and circuit breaker 173 (FIG. 9) which provides for activation of the fan 16. Referring again to FIG. 11, the system may operate in either a hand 174 or automatic 176 position, the distinction being that the exhaust fan 16 is left running in position 174 and a push button starting switch (generally located proximate the hood 12) is depressed to begin operation of the system. Other additional features in the FIG. 11 schematic include diode 178 for preventing a power surge from source 170 from damaging the electrical components and push button switch 180 for initiating automatic operation of the fan 16 and assembly.

Figure 2:
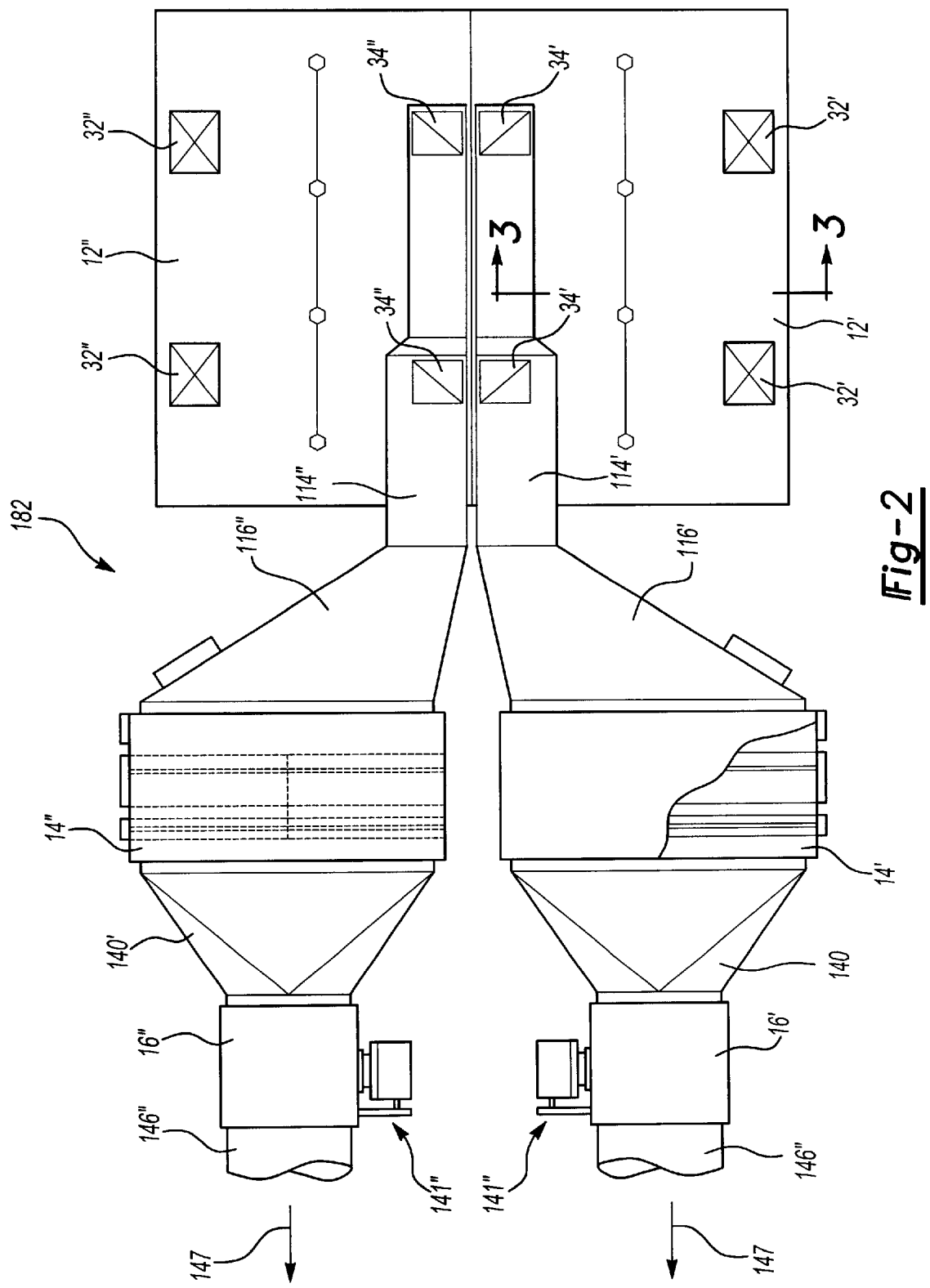
FIG. 2 is a top view of one proposed alternative design of the air scrubber assembly and which illustrates first and second ventilation hoods operably engaged by first and second filtration assemblies and exhaust fans according to the present invention.
Figure 5:
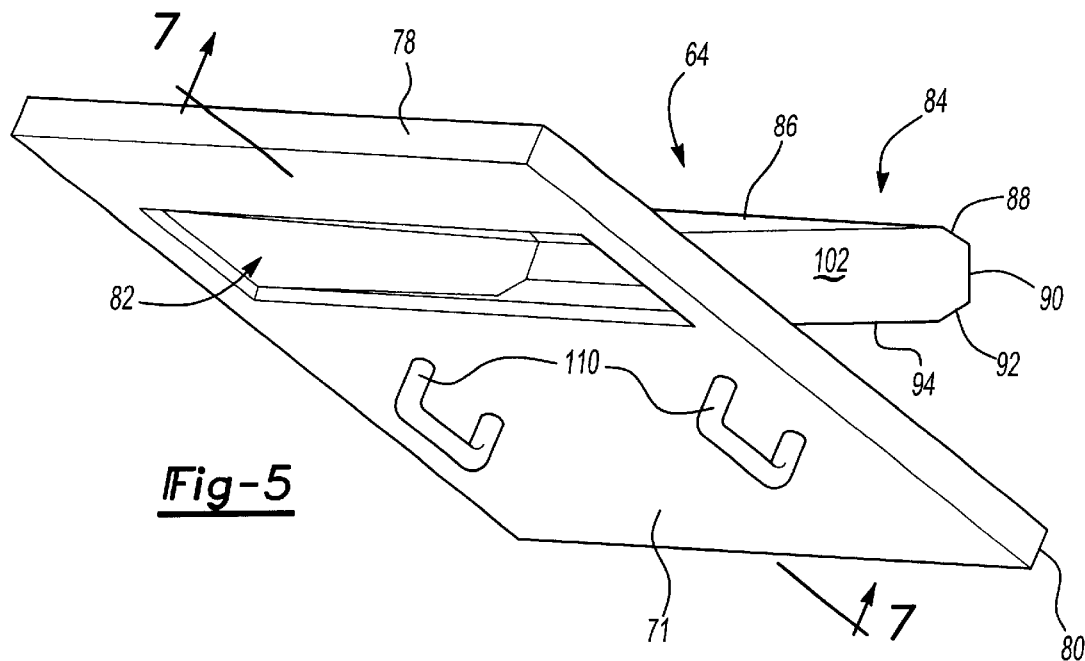
FIG. 5 is a sectional view of a selected grease extraction unit employed with the hood and according to the present invention.

Referring finally to FIG. 2, an alternate variant of the air scrubber assembly is illustrated at 182 and includes first 12' and second 12" ventilation hoods operably engaged by first and second filtration housings 14' and 14" and first and second exhaust fans 16' and 16", respectively. All of the pertinent structure relating to the intake 32 and exhaust 34 of the hood remains substantially the same and is represented as 32' and 32" and 34' and 34" for first 12' and second 12" of the hoods. Identical numbering is provided, such as at 114' and 114", 116' and 116", 140' and 140" and 146' and 146" for the first, second, third and fourth extending lengths of ductwork according to the arrangement of FIG. 2. The pair of filtration housings 14' and 14" also include individual banks of first, second, third and fourth stage filters as is illustrated and as has been previously described in detail. The variant of FIG. 2 illustrates but one possible application of the present invention and, according to this variant, identifies a situation where it would be useful to employ a pair of hoods, filtration housings and fans.

Having described our invention, it will become apparent that it discloses a novel air scrubber assembly which is not known in the present art. Additional preferred embodiments will become apparent to those skilled in the art to which it pertains and without deviating from the scope of the appended claims.

We claim:

1. A ventless air scrubber assembly adaptable for use with a conventional cooking appliance situated within an interior location, said assembly comprising:

a ventilation hood arrayed in an overhanging manner above the cooking appliance, said hood including a recessed interior defined by a plurality of interconnecting sides, said hood further including an intake and an exhaust, a plurality of individual grease extraction units being located within said hood in proximity to said exhaust;

a filtration housing having an inlet and an outlet, a first length of ductwork extending between said hood exhaust and said filtration housing inlet, said filtration housing including a plurality of individual filters arrayed between said inlet and said outlet, said filtration housing further including a plurality of separate channel frames for receiving each of said plurality of filters, each of said channel frames further including an enabling switch operatively communicating with a microprocessor mounted in proximity to said filtration housing, each of said enabling switches determining the engagement of a selected filter within a selected channel frame and enabling activation of the exhaust fan and operation of the assembly; and a second length of ductwork extending between said filtration housing outlet and an inlet of an exhaust fan, said exhaust fan drawing from the cooking appliance and across said grease extraction units and said filtration housing a steady flow of hot air which is contaminated with airborne particulates including grease and smoke, a third length of ductwork extending from an outlet of said exhaust fan and conveying reconditioned air for reintroduction within the interior location.

2. The air scrubber according to claim 1, said plurality of filters further comprising a first stage filter pleated grease filter having up to a 30% particle entrapment efficiency.

3. The air scrubber assembly according to claim 2, said plurality of filters further comprising a second stage extended surface filter having up to an 85% particle entrapment efficiency.

4. The air scrubber assembly according to claim 3, said plurality of filters further comprising a third stage HEPA filter having up to a 99.9% particle entrapment efficiency.

5. The air scrubber assembly according to claim 4, said plurality of filters further comprising a fourth stage pleated filter with activated carbon for removal of odors from the air flow.

6. The air scrubber assembly according to claim 5, further comprising monitoring means for signaling the requirement for replacing at least one of said first, second, third and fourth stage filters.

7. The air scrubber assembly according to claim 6, said monitoring means further comprising a first static pressure gauge mounted in proximity to an airflow across said first and second stage filters and operable, upon measuring a determined static pressure drop, to signal the requirement for replacement of a selected filter.

8. The air scrubber assembly according to claim 7, said monitoring means further comprising a second static pressure gauge mounted in proximity to an airflow across said third stage HEPA filters and operable, upon measuring a determined static pressure drop, to signal the requirement for replacement of the filter, said second gauge also, upon sensing an increased pressure drop exceeding a value contained in said microprocessor, causing a deactivation of said exhaust fan.

9. The air scrubber assembly according to claim 5, said filtration housing further comprising a fifth stage fire damper situated between said fourth stage filter and said exhaust fan, said fire damper including at least one fluid injection hose and a plurality of overlapping and planar shaped members pivotally interconnected in accordion fashion and gravity actuated to establish a firewall between said filtration housing and said exhaust fan.

10. The air scrubber assembly according to claim 9, each of said first, second, third and fourth stage filters further comprising a bank of four filters installed within said filtration housing in abutting end to end and coplanar fashion.

11. The air scrubber assembly according to claim 10, further comprising first and second ventilation hoods operably engaged by first and second filtration housings, respectively.

12. The air scrubber assembly according to claim 1, said recessed interior of said ventilation hood further comprising:

a planar base surface, a first extending side, a second spaced apart and extending side, a first interconnecting end and a second interconnecting end;

a supply plenum chamber defining a first sub-divided volume of said recessed interior and being located proximate said first side and said intake for receiving tempered air, an exhaust plenum chamber defining a second sub-divided volume of said recessed interior and being located proximate said second side and said exhaust.

13. The air scrubber assembly according to claim 12, said supply plenum chamber further comprising a plurality of interconnecting and planar shaped channeling walls for enclosing said first sub-divided volume, at least one fascia grill being mounted within said first extending side and causing said tempered inlet air to be drawn from said hood interior.

14. The air scrubber assembly according to claim 12, said exhaust plenum chamber further comprising a first and second spaced apart and angularly disposed brackets extending between said first and second interconnecting ends and for supporting each of said plurality of grease extraction units.

15. The air scrubber assembly according to claim 14, each of said grease extraction units further comprising:

a planar shaped main body with front and rear faces and including first and second opposite edges for respectively engaging said first and second angularly disposed brackets, an extractor opening being formed through said main body and which is defined by inwardly facing edges;

a channeling structure encircling said inwardly facing edges on said rear face and extending rearwardly in an angled direction, said channeling structure including a succession of turns against which is impacted the particulate laden airflow prior to said exhaust;

first and second extraction handles extending from said front face for removing said extraction unit from said brackets; and at least one grease extraction cup located in proximity to said second angularly disposed bracket and operable to collect grease and other particulates impinged against said channeling structure of said extraction units.

16. The air scrubber assembly according to claim 12, further comprising at least one vapor proof and incandescent light mounted to said planar base surface and extending downwardly within a central and third subdivided volume of said recessed interior.

17. A ventless filtration assembly for use with an overhanging ventilation hood mounted atop a conventional cooking appliance situated within an interior location, the hood including an exhaust outlet, said assembly comprising:

a housing located a remote distance from the hood and having an inlet and an outlet, a first length of ductwork extending between the exhaust outlet of the hood and said housing inlet, said housing including a plurality of separate channel frames for receiving a like plurality of filters between said inlet and said outlet, at least one of said filters exhibiting a particulate entrapment capability, at least one further of said filters exhibiting an odor removal capability, each of said channel frames further including an enabling switch operatively communicating with a microprocessor mounted in proximity to said filtration housing, each of said enabling switches determining the engagement of a selected filter within a selected channel frame and enabling activation of the exhaust fan and operation of the assembly;

at least one pressure gauge being mounted in proximity to an airflow across said filters and operable, upon measuring a determined pressure drop, to signal the requirement for replacement of a selected filter; and a second length of ductwork extending between said housing outlet and an inlet of an exhaust fan, said exhaust fan drawing from the appliance and hood a steady flow of hot air contaminated with airborne particles across said filters within said housing, a third length of ductwork extending from an outlet of said exhaust fan and conveying reconditioned air for reintroduction within the interior location.

18. A ventilation hood for use with a ventless and fan operated multi-filter air scrubber assembly, a conventional cooking appliance being situated within an interior location beneath said hood, said hood comprising:

a recessed interior defined by a planar base surface, a first extending side, a second spaced apart and extending side, a first interconnecting end and a second interconnecting end;

said hood including an intake and an exhaust;

a supply plenum chamber defining a first sub-divided volume of said recessed interior and being located proximate said intake for receiving tempered air;

an exhaust plenum chamber defining a second subdivided volume of said recessed interior and being located proximate said exhaust;

a plurality of individual grease extraction units being located within said hood in proximity to said exhaust and supported by first and second angularly disposed brackets, said grease extraction units further including a main body engaged between said brackets and an extractor opening being formed through said main body and which is defined by inwardly facing edges, said grease extraction units further including a channeling structure encircling said inwardly facing edges and extending rearwardly in an angled direction and including a succession of turns against which is impacted a particulate laden airflow produced by the cooking appliance, a gap being formed between selected planar surfaces of said channeling structure; and at least one grease extraction cup located in proximity to said second angularly disposed bracket and operable to collect grease and other particulates impinged against said channeling structure and communicated through said gaps in of said extraction units.

19. A ventless air scrubber assembly adaptable for use with a conventional cooking appliance situated within an interior location, said assembly comprising:

a ventilation hood arrayed in an overhanging manner above the cooking appliance, said hood including a recessed interior defined by a plurality of interconnecting sides, said hood further including an intake and an exhaust, a plurality of individual grease extraction units being located within said hood in proximity to said exhaust;

a filtration housing having an inlet and an outlet, a first length of ductwork extending between said hood exhaust and said filtration housing inlet, said filtration housing including a plurality of individual filters arrayed between said inlet and said outlet, said filtration housing further including a plurality of separate channel frames for receiving each of said plurality of filters; and a second length of ductwork extending between said filtration housing outlet and an inlet of an exhaust fan, said exhaust fan drawing from the cooking appliance and across said grease extraction units and said filtration housing a steady flow of hot air which is contaminated with airborne particulates including grease and smoke, a third length of ductwork extending from an outlet of said exhaust fan and conveying reconditioned air to a location remote from both said hood and said housing.

\* \* \* \* \*